Nov. 30, 1965    G. VAN GELDER ETAL    3,220,305
MULTIPLE PROJECTOR SYSTEM
Filed Sept. 27, 1962    4 Sheets-Sheet 1

INVENTORS
GOZEWIJN V. GELDER
WILHELMUS L. VERVEST
HENDRIK W. DE VRIES
BY
AGENT

Nov. 30, 1965   G. VAN GELDER ETAL   3,220,305
MULTIPLE PROJECTOR SYSTEM
Filed Sept. 27, 1962   4 Sheets-Sheet 3
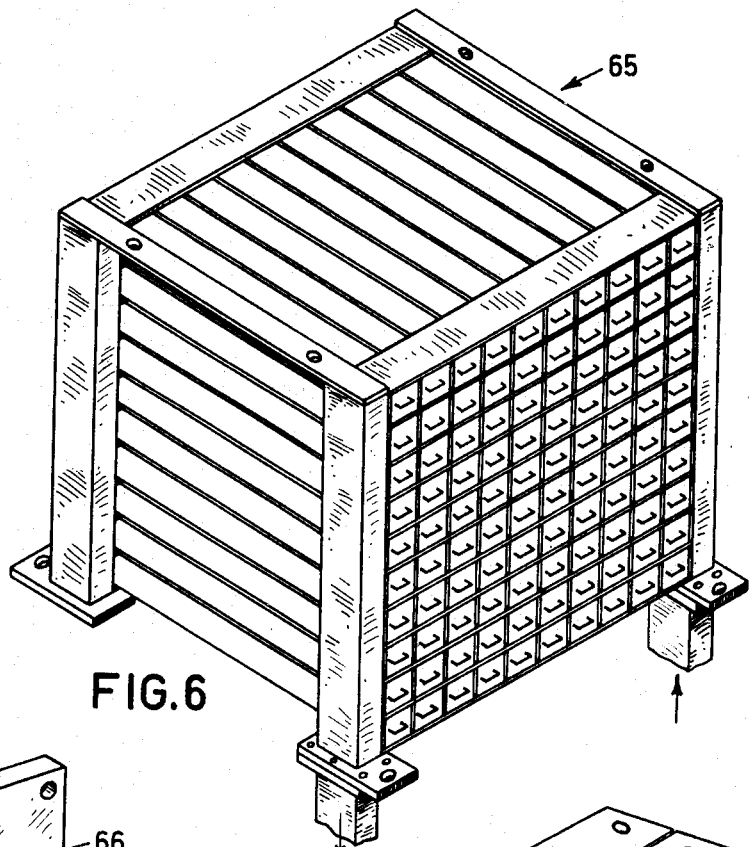
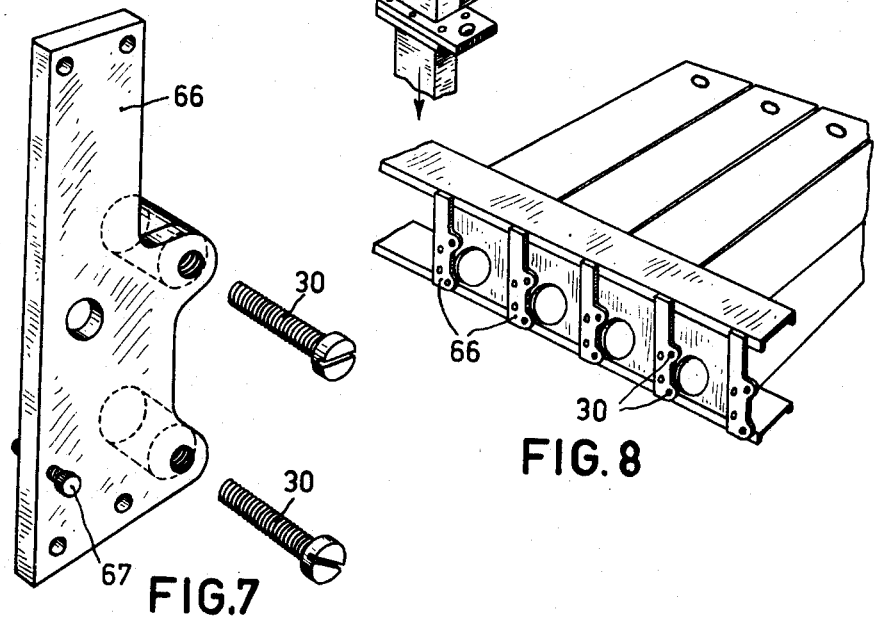
INVENTORS
GOZEWÜN V. GELDER
WILHELMUS L. VERVEST
HENDRIK W. DE VRIES
BY
Frank R. Trifari
AGENT

United States Patent Office 3,220,305
Patented Nov. 30, 1965

3,220,305
MULTIPLE PROJECTOR SYSTEM
Gozewijn van Gelder, Wilhelmus Lambertus Vervest, and Hendrik Willem de Vries, Hilversum, Netherlands, assignors to North American Philips Company, Inc., New York, N.Y., a corporation of Delaware
Filed Sept. 27, 1962, Ser. No. 226,589
Claims priority, application Netherlands, Oct. 5, 1961, 269,970
5 Claims. (Cl. 88—24)

The invention relates to a projector system for projecting an index mark, for example an arrow, in which each projector is provided with two pivotable mirrors having skew pivot axes, the first mirror directing the image of the index mark produced by a source of light on to the second mirror which directs the mark on to the screen, while the mirrors cause the mark to travel over the screen by pivotal movement about their axes, the said projectors being capable of being inserted in any of a plurality of holders arranged side by side in a rack of a multiple projector system.

Such a projector system in which the index mark of each projector is capable of travelling over the entire screen is suitable, for example, for use in lectures. The lecturer is enabled to point out various points on the screen without using a pointer. The system is also very suitable for controlling traffic from a central point. Each projector may indicate a particular object on a map and accurately follow its movements. Thus one gets a survey of the traffic situation in a certain region permitting of ascertaining where measures have to be taken.

The projector arranged in the central axis of the screen in the zero position of the mirrors (that is to say, when both mirrors are at an angle of 45°) generally directs the index mark on the center of the screen. On deflection of the mirrors the mark on the screen points at a place corresponding to the deflection. Projectors arranged outside of the central axis direct their index marks on to points of the screen which do not coincide with the point on which the mark is directed by the central projector with the same change in position of the mirrors.

With all the mirrors set to the zero position the axes of the image producing beams of rays of all projectors may be directed on the center of the screen. If the mark of the central projector is caused to trace a rectangle on the screen, the mark of each projector arranged outside the central axis traces a parallelogram on the screen with the same mirror adjustment, the difference from the rectangle increasing with increase of the distance by which the relevant projector is spaced from the central axis. In this arrangement the projectors may be dipsosed on a circle surface so that each projector is spaced the same distance from the projection center, however, in this case also the deviation of the position indicated by the mark remains unadmissibly large and further the shape of the rack accommodating the projectors becomes complicated.

All projectors may alternatively be arranged in known manner so that their beam axes extend parallel to one another. However, with equal change in position of the mirrors of different projectors the marks projected on the screen do not coincide.

It is the object of the present invention to provide a multiple projector system enabling the discrepancies in position of the mark on the screen owing to the side by side arrangement of the projectors to be overcome by simple means while the manufacture of the rack need not satisfy exacting requirements. For this purpose the holders in the rack for accommodating the projectors are each provided with adjustable stops to cooperate with movable and preferably adjustable abutment members in the projectors which act upon the mechanism effecting the change of position of the mirrors. When a projector is accommodated in any holder of the rack the two mirrors which are assumed to be, for example, in their zero positions, are adjusted by the abutment members so that the index mark is directed on to a particular part, for example, on the center of the screen. If now the positions of the mirrors are changed the mark travels the same path as with the same change in position of the mirrors of the central projector.

The abutment members of the projectors may be adjusted with the aid of a set screw so that the projectors are interchangeable. This adjustment need only be performed once. The stops in each holder of the rack also need be adjustable once only in a manner such that the mirrors of a projector which are in the zero position are adjusted so that the index mark is directed on the center of the screen. Each projector may then be arranged in any holder of the rack, for the mark invariably indicates the desired position. A further advantage of the adjustable stops is that in manufacturing the rack the tolerances need not satisfy exacting requirements.

The stops in the rack preferably are studs adapted to be adjustably arranged in the rack with the aid of screw-thread, while the abutment members in the projector comprise strips, studs or the like containing adjusting members in the form of a screw or the like, said abutment members being connected to a mechanism for changing the position of the mirrors each mechanism on a whole being adapted to slide in a sleeve, while the abutment members of the projector are urged against the adjustable studs by spring force.

In order that the invention may be readily carried into effect, embodiments thereof will now be described, by way of example, with reference to the accompanying diagrammatic drawings, in which:

FIG. 6 shows schematically a rack;

FIGS. 7 and 8 show the stops secured to a strip in the rack, and

Figure 1:
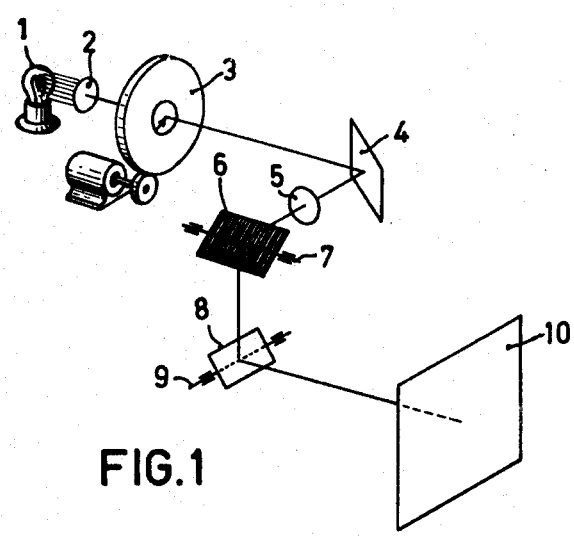
FIG. 1 shows schematically a projector.

Referring now to FIG. 1, each projector comprises a source of light 1 the light of which is directed by a condenser 2 on to a rotatable disc 3 containing an index mark which may have the form of an arrow and adapted to be rotated in accordance with the desired direction of the arrow. The index mark may alternatively be built up from several marks or digits provided on transparent discs or plates arranged one behind the other. The ray beam, which in the figure extends horizontally, then strikes a stationary mirror 4 which deflects the beam through an angle of 90° in the horizontal plane and is provided to enable the ray beam ultimately to leave the projector in the longitudinal direction. The mirror 4 directs the mark on to an objective 5 which directs it on to a first pivoting mirror 6 adapted to pivot about an axis 7 and ensuring the movement of the mark over the screen in one direction, in FIG. 1 the horizontal direction.

The ray beam strikes a mirror 6 at the mid-point of the pivoting axis. The ray reflected from the mirror 6 falls on the second pivoting mirror 8 which it strikes at a point of the pivoting axis 9 which is determined by the angular adjustment of the first pivoting mirror 6. The mirror 8 provides for the vertical movement of the mark over the screen. The screen on to which the mark is projected is designated 10.

The skew pivoting axes 7 and 9 may be at an arbitrary angle to one another. It is, however, desirable for the axes 7 and 9 to be at right angles to one another and to be situated at least substantially in the associated mirror planes. This ensures that pivotal movement of the mirrors does not change the direction of the projected arrow.

Figures 2A, 2B:
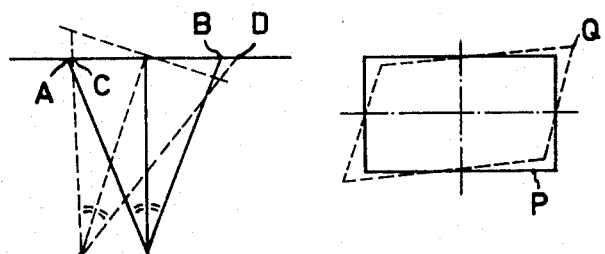
FIGS. 2a and 2b show the positional deviations of the index mark produced by a projector which is arranged outside the central axis and the axis of which is directed on the center of the screen, as compared with the mark of the central projector.

FIGS. 2a and 2b show the positional deviation of the index mark produced by a projector which is not arranged on the central axis and has its axis directed on to the center of the screen. With a certain deflection of a mirror a central projector P directs the index mark on to a point A or B of the screen. With equal deflection of the mirror a mark produced by a projector Q which is not arranged on the central axis falls on the screen at a point C or D. When the projector P causes the mark to trace a rectangle on the screen (FIG. 2b) the path traced by the mark of the projector Q with the same movement of the mirrors is a parallelogram. The shape of the parallelogram relative to the rectangle depends upon the position of the projector Q relative to the projector P. Hence the projector Q provides a position indication which especially in the corners of the screen widely deviates from the correct position to be indicated by the mark.

Figures 3A, 3B:
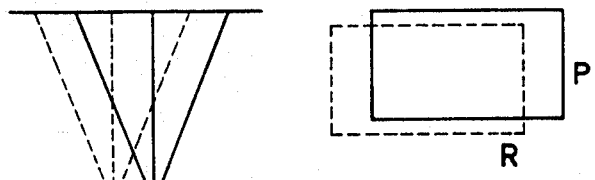
FIGS. 3a and 3b show that the positional deviations of the index mark of a projector relative to the mark produced by the centrally arranged projector, the axes of the beams projecting the marks extending parallel to one another.

If all the projectors are directed on to the screen so that their beam axes projecting the marks extend parallel to one another, the index mark produced by a projector R is always shifted through the same distance with respect to the mark produced by the centrally arranged projector P, c.f., FIGS. 3a and 3b. In this arrangement the use of the invention ensures complete correction of the erroneous indication of the projector R. For this purpose the two mirrors of the projector R with the aid of abutment members provided on the projector and stops provided on a rack accommodating the projector are preset so that the index marks of the projectors P and R, with the same mirror adjustment by the mirror driving motors, coincide on the screen. Since the position of the index mark of the uncorrected projector R always deviates from the position of the index mark of the projector P by the same value, the index marks of the two projectors always coincide if after pre-setting the mirrors of the two projectors are rotated about the same angle.

Figure 4:
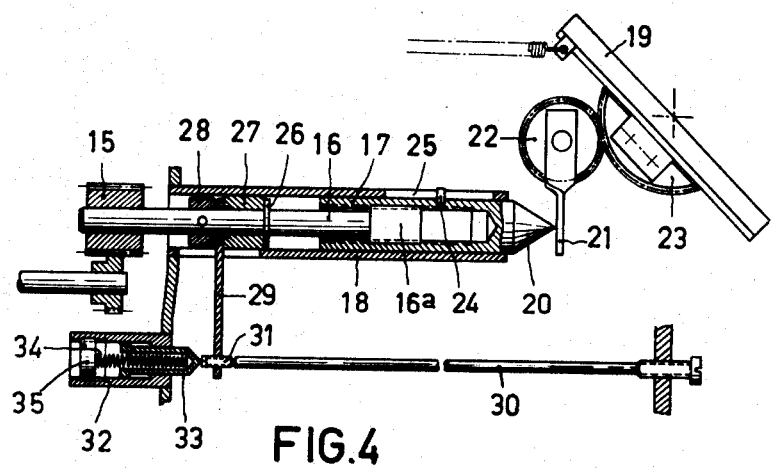
FIG. 4 shows an embodiment of a mirror adjusting mechanism with abutment members.

FIG. 4 shows an embodiment of one of the mirrors of a projector with the associated driving device and the abutment members providing a correct pre-setting of the mirror. There are, of course, also such abutment members provided for the pre-setting of the other mirror of the projector. The motor, not shown, for changing the position of a mirror 19 is adapted to drive a gear-wheel 15 mounted on a shaft 16. The shaft 16 has a thickened end portion 16a provided with screwthread. The portion 16a co-operates with the elongated nut 17 which performs an axial movement on rotation of the shaft 16. The nut is adapted to slide in a coaxially arranged sleeve 18 and is locked against rotation with the aid of a key 24 projecting through a slit 25 in the sleeve 18. At its end the nut 17 is provided with an adjusting stud 20 enabling a lever 21 to be adjusted. To the lever 21 is secured a gearwheel 22 meshing with a gearwheel 23. The gear ratio of the wheels is 1:2. The mirror 19 is secured to the gearwheel 23. The gear 21, 23 is provided to ensure that when the nut 17 is axially moved in equal steps the mark on the screen travels the same distance at each step.

The shaft 16 is provided with a shoulder 26 which is engaged by a sleeve 27 adapted to slide in the sleeve 18. The sleeve 27 is locked against axial movement on the shaft with the aid of an adjusting ring 28. A strip-shaped member 29 is clamped on the sleeve 27. The strip 29 which is an abutment strip projects through a slit-shaped aperture in the sleeve 18 and is provided with an adjustable stop in the form of a set screw 31. By displacing the strip with respect to the sleeve 18 the entire driving mechanism in the sleeve 18 is shifted and the mirror 19 is adjusted to another position. The gear-wheel 15 also is shifted with respect to the motor and hence must have a certain length. When the projector is inserted into a holder of the rack, the screw 31 provided in the strip 29 engages an adjustable abutment member in the form of a pin or rod 30 mounted in the rack, for example, with the aid of screwthread. The other end of the screw 31 is engaged by a spring mechanism comprising a housing 32 which is rigidly secured in the projector and in which a plunger 33 is adapted to slide. A part of the plunger 33 protruding from the housing is urged against the screw 31 by a spring 34 which is adjustable with the aid of an adjusting nut 35.

Figure 9:
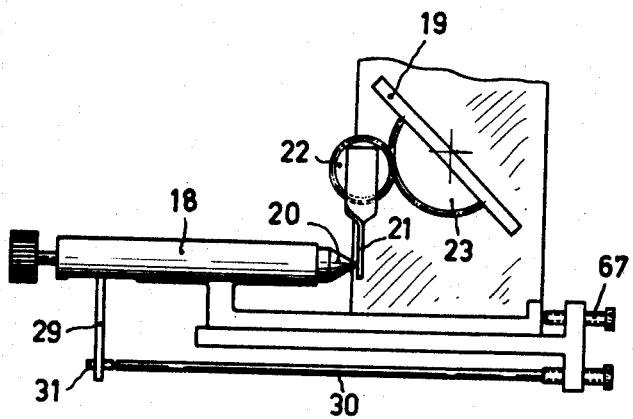
FIG. 9 shows in simplified form the abutment members of the projector and the co-operating stops of the rack.

The projectors are arranged in a steel rack 65 (FIG. 6) divided into a plurality of holders for the projectors. To the front of each holder is secured a metal strip 66 (FIGS. 7 and 8) into which two pins 30 can be screwed and in which an abutting screw 67 is secured. FIG. 9 shows a simplified arrangement of the adjusting members for one of the mirrors in the projector in the rack. The other mirror is adjusted in the same way. With a view to interchangeability all the projectors must be inserted into the rack to the same depth. For this purpose they may abut against the screws 67 which are provided in all the holders and are adjusted so that their ends lie in a single plane. Alternatively the screws 67 may be replaced by abutment surfaces lying exactly in one plane. When a projector is inserted into the central holder, the mirrors must be at an angle of 45° and the index mark must be directed to a particular point, for example, to the center of the screen. The pin 30 in this holder which is adjusted to a certain length serves as a stop for the adjusting nut provided in the strip 29. Since the strip 29 is capable of displacing the driving mechanism of the mirror, the mirror is set at a pre-determined angle. If the angle differs from 45°, the strip 29 is displaced by turning the adjustable stop or screw 31 so that the mirror is correctly positioned. The screw 31 need only be adjusted once and is locked in the adjusted position. All the projectors are adjusted in this manner and hence are interchangeable. If a projector adjusted in this manner is arranged, with the mirrors in the zero position (that is to say, at an angle of 45°), in another holder of the rack, the index mark must also be directed on to the center of the screen. For this purpose the adjustable abutment member or stud 30 for each mirror is turned so that the strip 29 displaces the driving mechanism of the mirror in the sleeve 18 until the index mark falls on the center of the screen. The relevant adjustable abutment members or studs 30 are then locked in this position in the holder. After all the studs 30 have been adjusted in this manner each projector may be inserted in any holder of the rack while retaining a correct position indication of the index mark on the screen. Due to the use of the adjustable abutment members the rack need not satisfy exacting requirements with respect to accuracy in manufacture and assembly. The point at which the strip 29 is secured to the sleeve 27 is not critical either.

Figure 5:
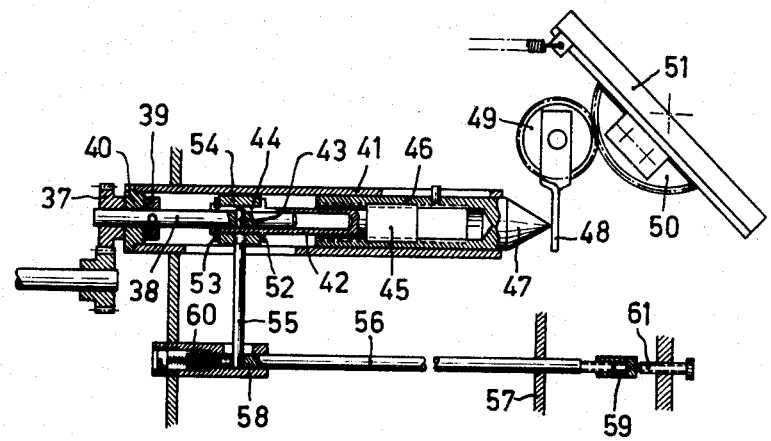
FIG. 5 shows another embodiment.

FIG. 5 shows a slightly modified embodiment of the driving mechanism for each of the mirrors. In this embodiment a gearwheel 37 is not shifted on displacement of the abutment members in the projector and hence need not be extraordinarily wide. In this embodiment the gearwheel 37 secured to a shaft 38 is arranged so as to engage the outer surface of a cover 40 of a sleeve 41, a locking ring 39 secured to the shaft 38 engaging the inner surface of the cover 40. Thus the shaft 38 is incapable of axial movement. A shaft 42 at one end is provided with a bore in which the end of the shaft 38 is inserted with a sliding fit. In the shaft 38 is provided a key 43 projecting into a keyway 44 in the shaft 42 and hence compelling the latter shaft to follow the rotation of the gearwheel 37. Another end of the shaft 42 has a thickened part 45 provided with external screwthread and co-operating with an elongated nut 46 so as to impart a translatory movement thereto. The nut 46 is provided with an adjusting stud 47 adapted to pivot a mirror 51 wtih the aid of a lever 48 and gearwheels 49 and 50. A sleeve 54 surrounds the shaft 42 between a shoulder 52 and a locking ring 53. A stud 55 is secured in the sleeve 54 with the aid of screwthread. The stud 55 protrudes through a slit in the sleeve 41 and its other end is clamped in a rod 56. This rod is adapted to slide in a wall part 57 of the projector and in a housing 58 of a spring mechanism. The rod 56 is provided with an adjusting nut 59 which, when the projector is arranged in the rack, under the action of a spring 60 engages an abutment bolt 61 adjustably mounted in the rack. In the embodiment shown in FIG. 4 the sleeve 27 carrying the abutment strip 29 has to be slidably supported in the sleeve 18 to prevent the shaft 16 being loaded by inclination of the sleeve 27. In the embodiment shown in FIG. 5 the sleeve 54 to which the stud 55 is secured is prevented from assuming an inclined position because the rod 56 is guided in the above described manner. On displacement of the rod 56 and hence of the stud 55 the shaft 42 is moved with respect to the shaft 38 and axially displaces the nut 46 and hence changes the position of the mirror 51. In this embodiment the gearwheel 37 is not shifted and consequently need not have a large width in contradistinction to the gearwheel 15 of FIG. 4.

The adjustment of the stops in the projector and the rack may be effected in a manner identical to that described with reference to the projector system shown in FIG. 4.

The system described may also be used to advantage in projection on to a curved screen.

What is claimed is:

1. A projector system for projecting a plurality of objects on a screen comprising at least two projectors, each projector being provided with a source of light and two pivotable mirrors having their axes positioned obliquely relative to each other, the first mirror directing the image of said object produced by said source of light on said second mirror which, in turn, directs said image on said screen, said mirrors pivoting about their axes thereby causing said images to travel over said screen, a mechanism for effecting a change in position of said mirrors, a rack having a plurality of holders for said projectors whereby the latter are arranged side by side therein, said rack being provided with adjustable stops, and a plurality of adjustable abutment members which coact with said adjustable stops to act upon said mechanism effecting the change in position of said mirrors.

2. A projector system for projecting a plurality of objects on a screen as claimed in claim 1 wherein said adjustable stops are screw-threaded studs.

3. A projector system for projecting a plurality of objects on a screen as claimed in claim 1 further comprising abutment strips in the form of elongated strips which operatively connect said abutment members to said mechanism for effecting the change in position of said mirrors.

4. A projector system for projecting a plurality of objects on a screen as claimed in claim 1 wherein said abutment members are studs having adjustment members in the form of screws.

5. A projector system for projecting a plurality of images of objects on a screen comprising at least two projectors, each projector being provided with a source of light and two pivotable mirrors having their axes positioned obliquely relative to each other, the first mirror directing the image of an object produced by said source of light on said second mirror which, in turn, directs said image on said screen, said mirrors pivoting about their axes thereby causing said images to travel over said screen, a mechanism for effecting a change in position of each of said mirrors, a rack having a plurality of holders for mounting said projectors in rows, said rack being provided with adjustable stops, a plurality of abutment members each being connected to a corresponding mechanism for effecting said change in position of each of said mirrors, and a plurality of sleeves, each of said mechanisms being adapted to slide in a corresponding sleeve and in one position thereof to cause said mirror to be pivoted about its axis.

References Cited by the Examiner
UNITED STATES PATENTS

| | | | |
|---|---|---|---|
| 2,495,296 | 1/1950 | Springer | 340—24 |
| 2,600,261 | 6/1952 | Pennington | 88—24 |
| 2,714,199 | 7/1955 | Adams et al. | 88—24 |
| 2,944,461 | 7/1960 | Howell et al. | 84—24 |

NORTON ANSHER, *Primary Examiner.*

EVON C. BLUNK, EMIL G. ANDERSON, *Examiners.*